(12) United States Patent
Nakaoka et al.

(10) Patent No.: US 8,224,128 B2
(45) Date of Patent: Jul. 17, 2012

(54) PORTABLE INFORMATION TERMINAL DEVICE

(75) Inventors: Akira Nakaoka, Hiroshima (JP); Junichi Shimizu, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 1035 days.

(21) Appl. No.: 11/996,185

(22) PCT Filed: Jul. 12, 2006

(86) PCT No.: PCT/JP2006/313875
§ 371 (c)(1), (2), (4) Date: Jul. 16, 2008

(87) PCT Pub. No.: WO2007/010799
PCT Pub. Date: Jan. 25, 2007

(65) Prior Publication Data
US 2009/0141948 A1    Jun. 4, 2009

(30) Foreign Application Priority Data
Jul. 22, 2005  (JP) .................. 2005-212806

(51) Int. Cl.
*G06K 9/00* (2006.01)
*G05B 19/00* (2006.01)
*G06F 15/16* (2006.01)
*G06F 21/00* (2006.01)

(52) U.S. Cl. ....... 382/305; 382/118; 340/5.82; 709/229; 713/186

(58) Field of Classification Search ............. 382/305, 382/118, 115; 340/5.82
See application file for complete search history.

(56) References Cited

U.S. PATENT DOCUMENTS

| 4,757,533 A | * | 7/1988 | Allen et al. | 713/192 |
| 5,331,616 A | * | 7/1994 | Morita et al. | 369/53.42 |
| 5,835,015 A | * | 11/1998 | Ikeda | 340/568.1 |

(Continued)

FOREIGN PATENT DOCUMENTS

JP    8-54667 A    2/1996

(Continued)

*Primary Examiner* — Michelle Entezari
(74) *Attorney, Agent, or Firm* — Birch, Stewart, Kolasch & Birch, LLP

(57) ABSTRACT

An objective of the present invention is to provide a portable information terminal device capable of exclusively storing information which is useful to identify an illegal user.

If a matching degree between characteristic information extracted from a photographed image by a characteristic extraction part 402A and registered characteristic information is determined to be smaller than an authentication threshold value by a matching degree determination part, 402C, an error history information management part 404 causes an error history information storage part 414 to store error history information obtained at that time. Therefore, history information obtained when authentication has failed in the authentication process is stored as error history information only when a person who differs from a true user such as, for example, a person who has stolen a mobile phone tries to use the mobile phone illegally and characteristic information is extracted from a face image of the person, so that the person can be identified from the error history information after the mobile phone is retrieved.

6 Claims, 11 Drawing Sheets

U.S. PATENT DOCUMENTS

| | | | | |
|---|---|---|---|---|
| 6,097,306 A * | 8/2000 | Leon et al. | | 340/5.1 |
| 6,161,185 A * | 12/2000 | Guthrie et al. | | 726/5 |
| 6,356,941 B1 * | 3/2002 | Cohen | | 709/219 |
| 7,055,071 B2 * | 5/2006 | Austen et al. | | 714/48 |
| 7,421,733 B2 * | 9/2008 | Glassman et al. | | 726/6 |
| 2002/0059532 A1 * | 5/2002 | Ata et al. | | 713/202 |
| 2003/0053662 A1 * | 3/2003 | Evoy et al. | | 382/115 |
| 2004/0017934 A1 * | 1/2004 | Kocher | | 382/125 |
| 2005/0192778 A1 * | 9/2005 | Suzuki et al. | | 702/185 |
| 2005/0229020 A1 * | 10/2005 | Goodman et al. | | 714/2 |
| 2006/0187034 A1 * | 8/2006 | Styers et al. | | 340/545.1 |

FOREIGN PATENT DOCUMENTS

| | | |
|---|---|---|
| JP | 8-54667 A | 2/1996 |
| JP | 2000-278658 A | 10/2000 |
| JP | 2000-278658 A | 10/2000 |
| JP | 2004-288124 A | 10/2004 |
| JP | 2004-288124 A | 10/2004 |
| JP | 2005-84991 | 3/2005 |
| JP | 2005-84991 A | 3/2005 |
| JP | 2005-115485 A | 4/2005 |
| JP | 2005-115485 A | 4/2005 |

\* cited by examiner

[FIG. 1]
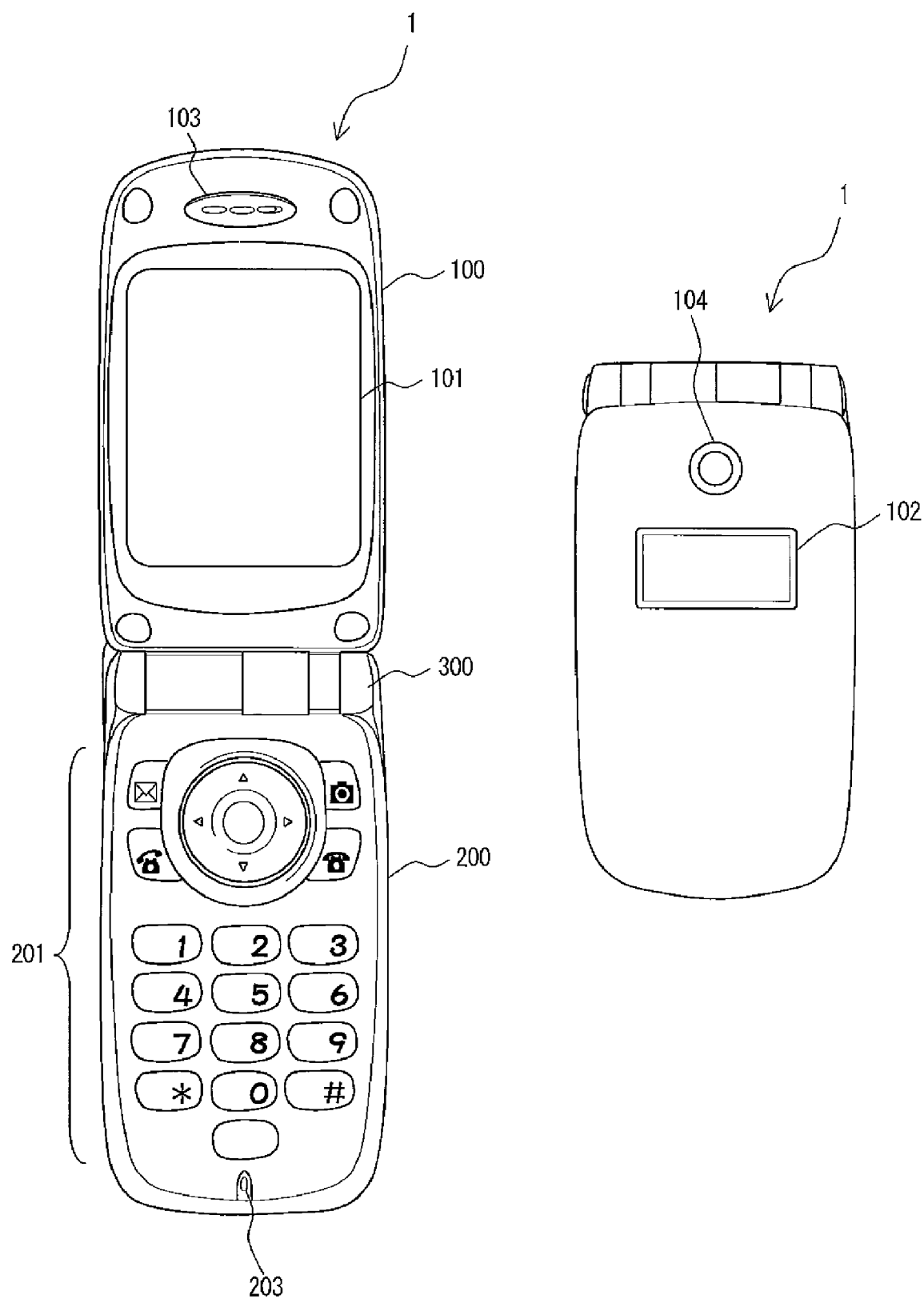

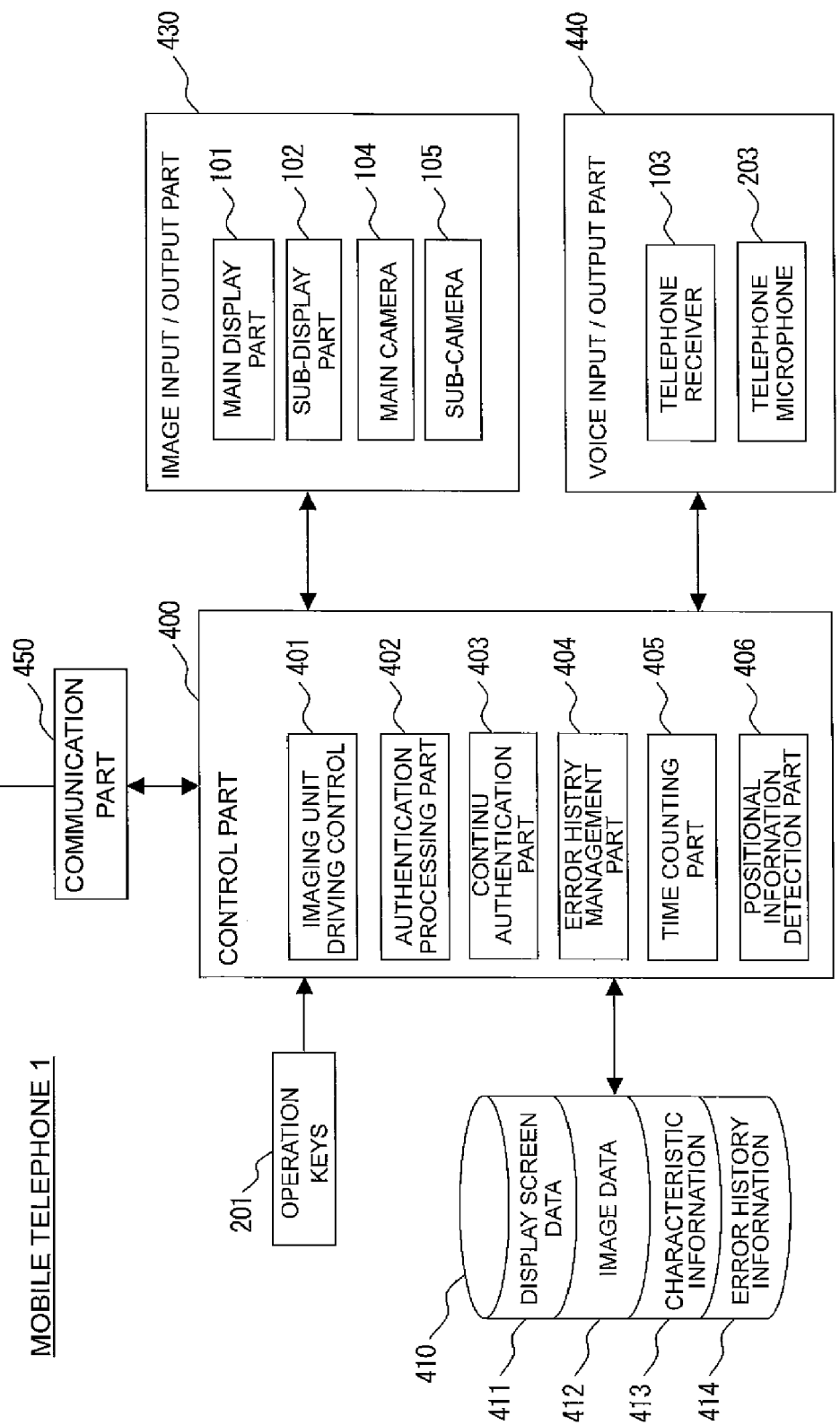
[FIG. 2]

[FIG. 3]
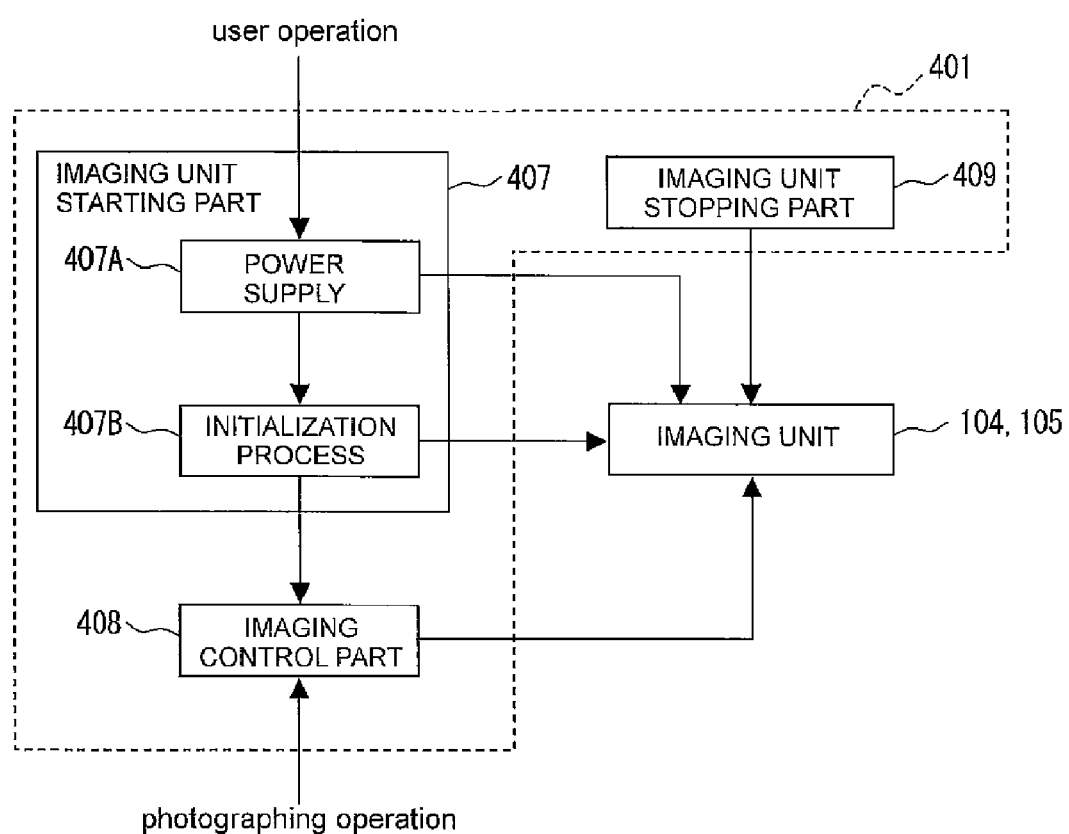

[FIG. 4]
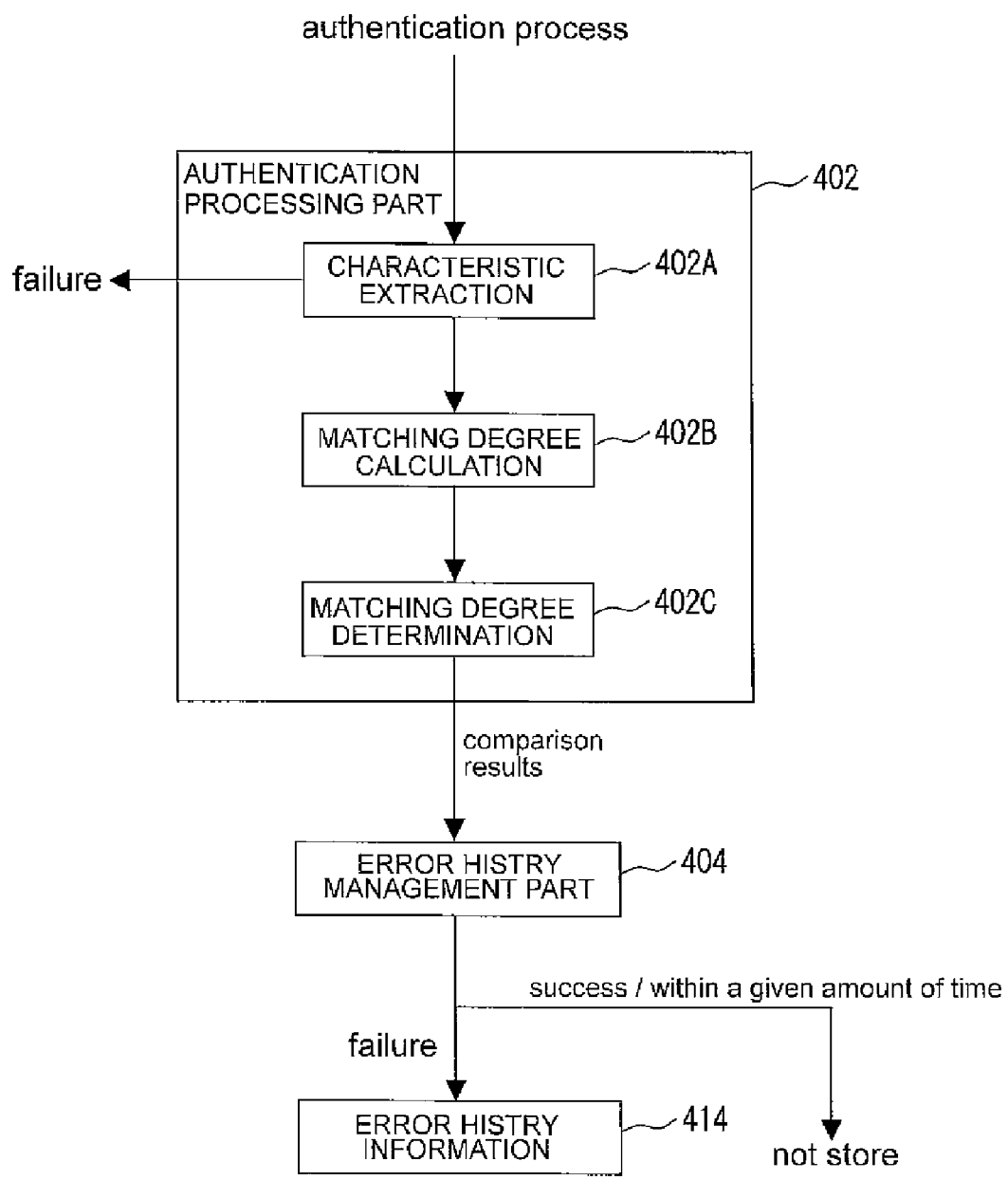

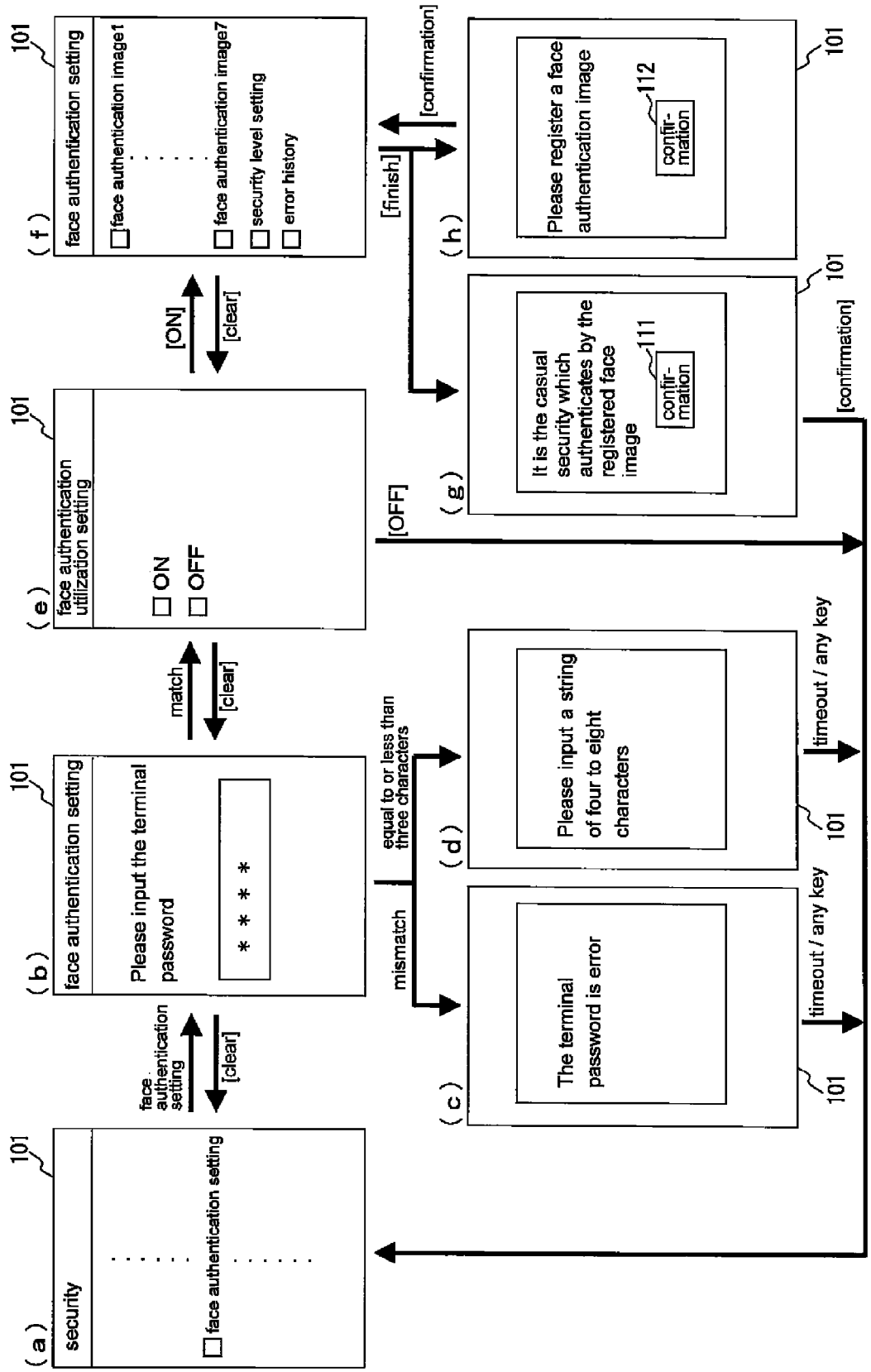
[FIG. 5]

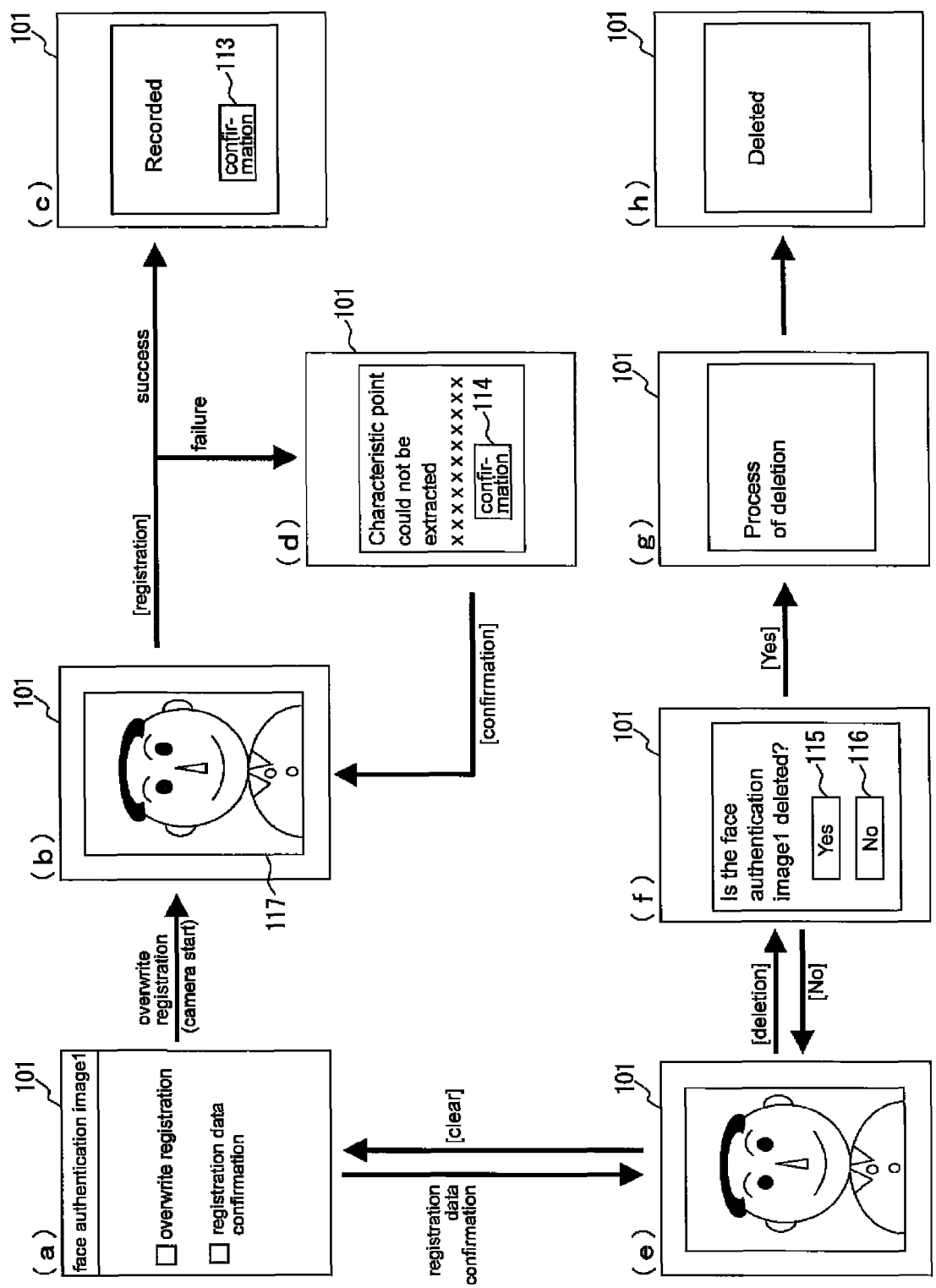

[FIG. 7]
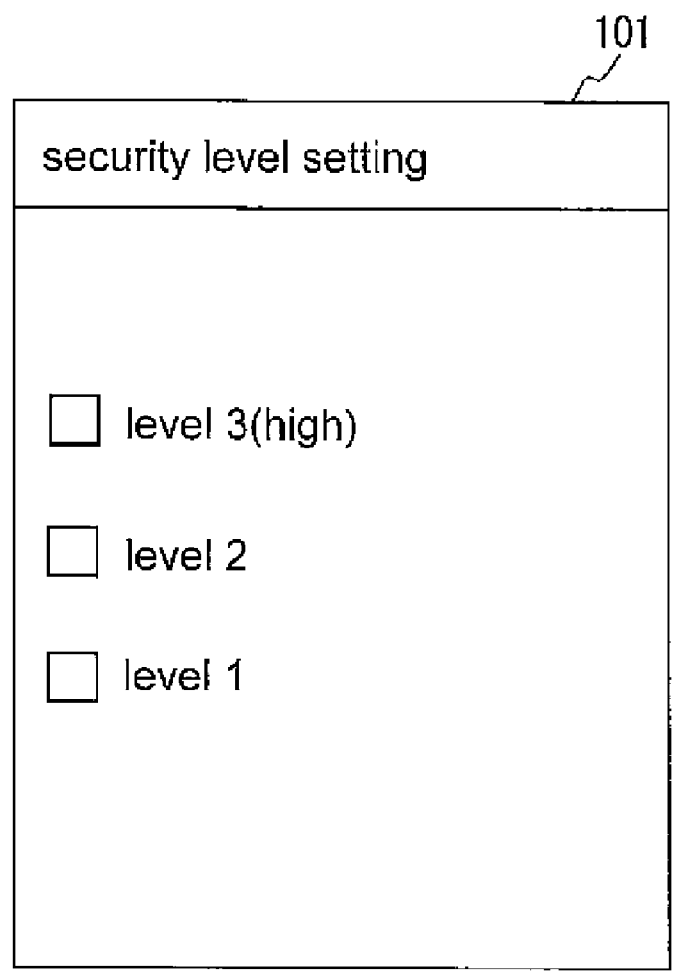

【FIG. 8】
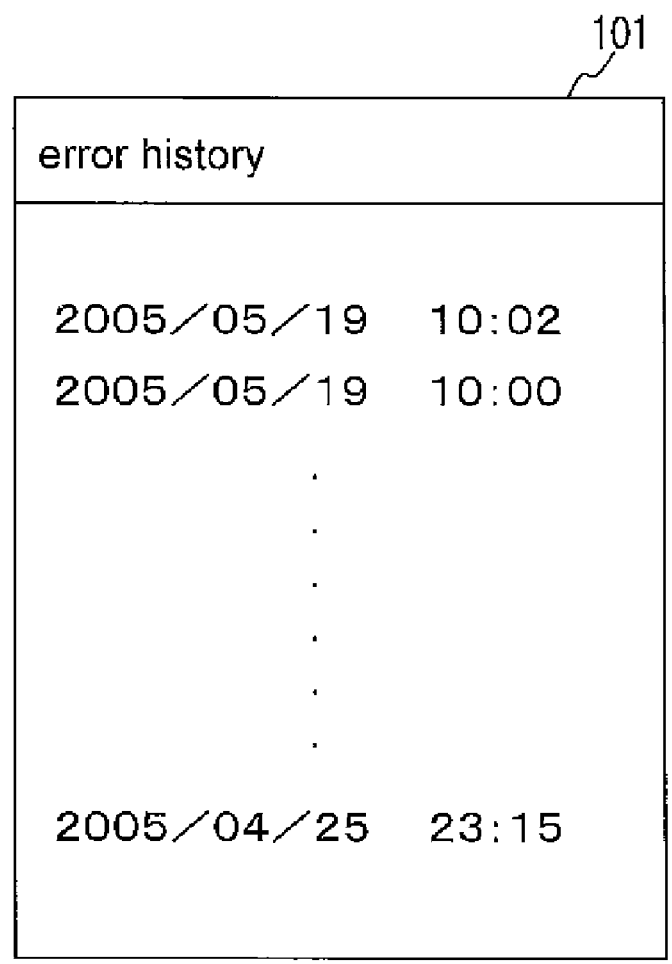

[FIG. 9]
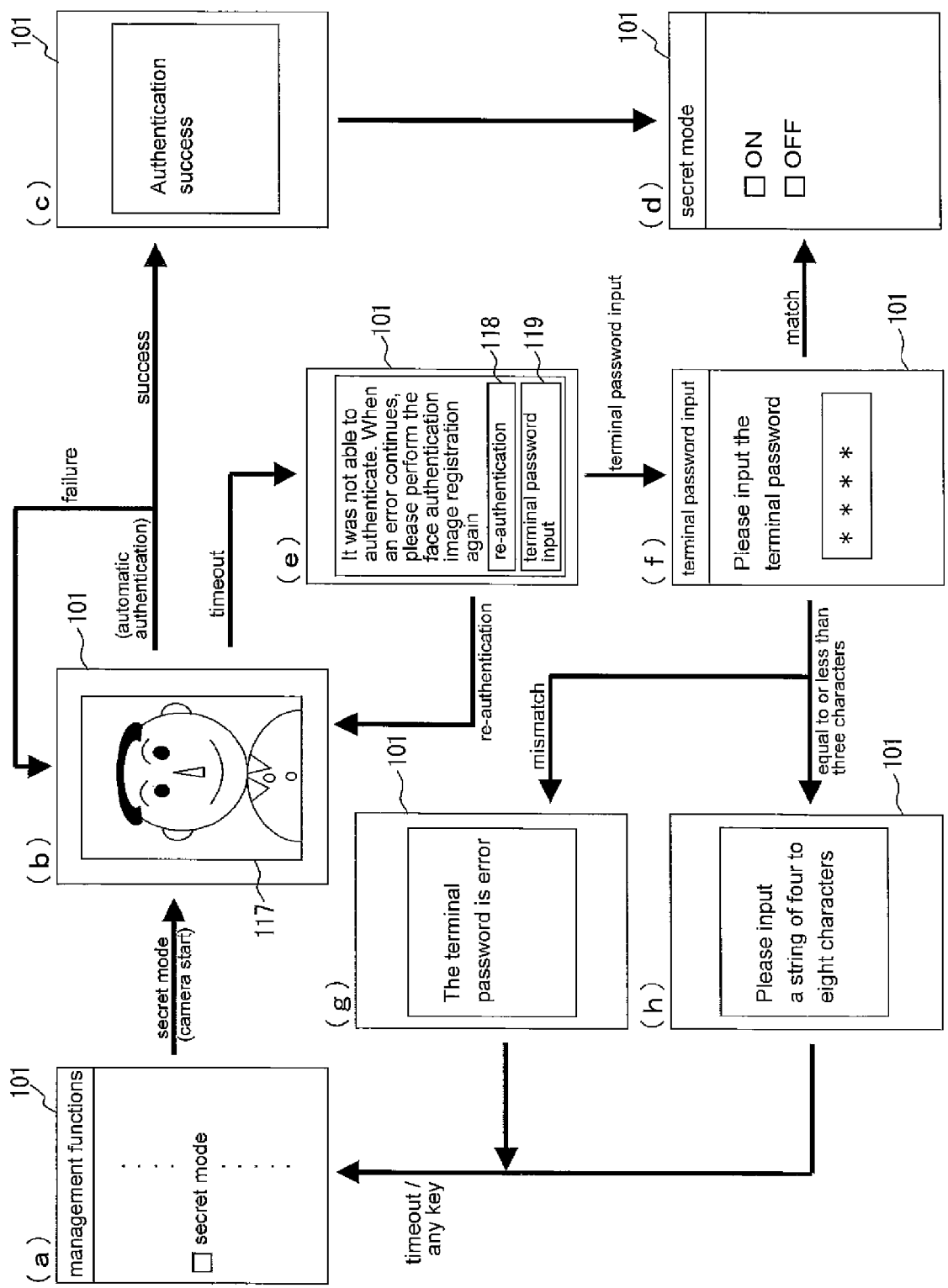

[FIG. 10]
(a) 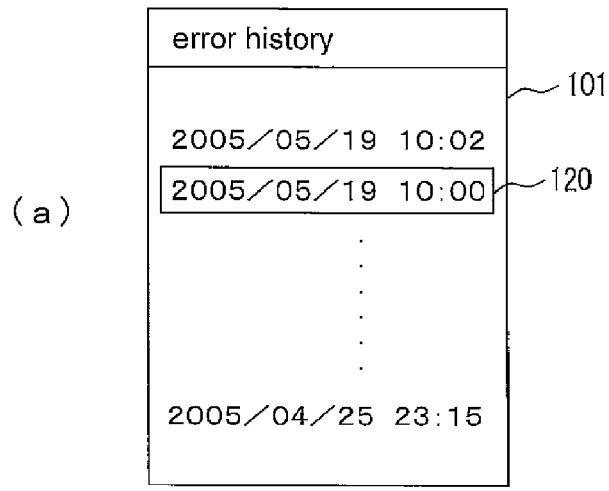
(b) 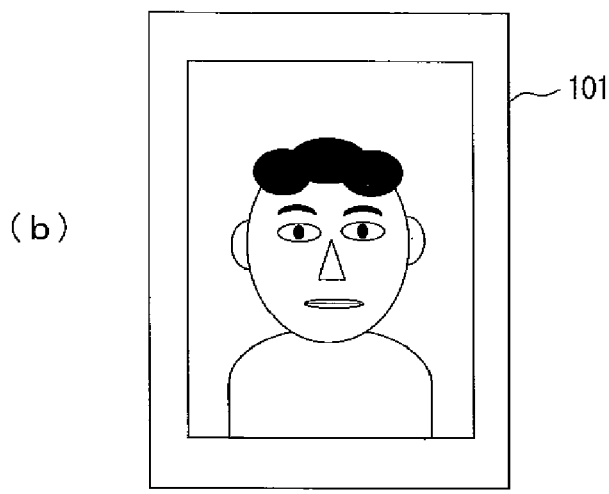
(c) 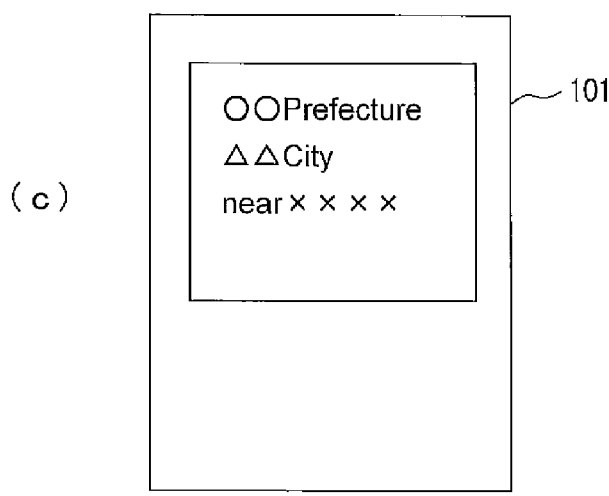

【FIG. 11】
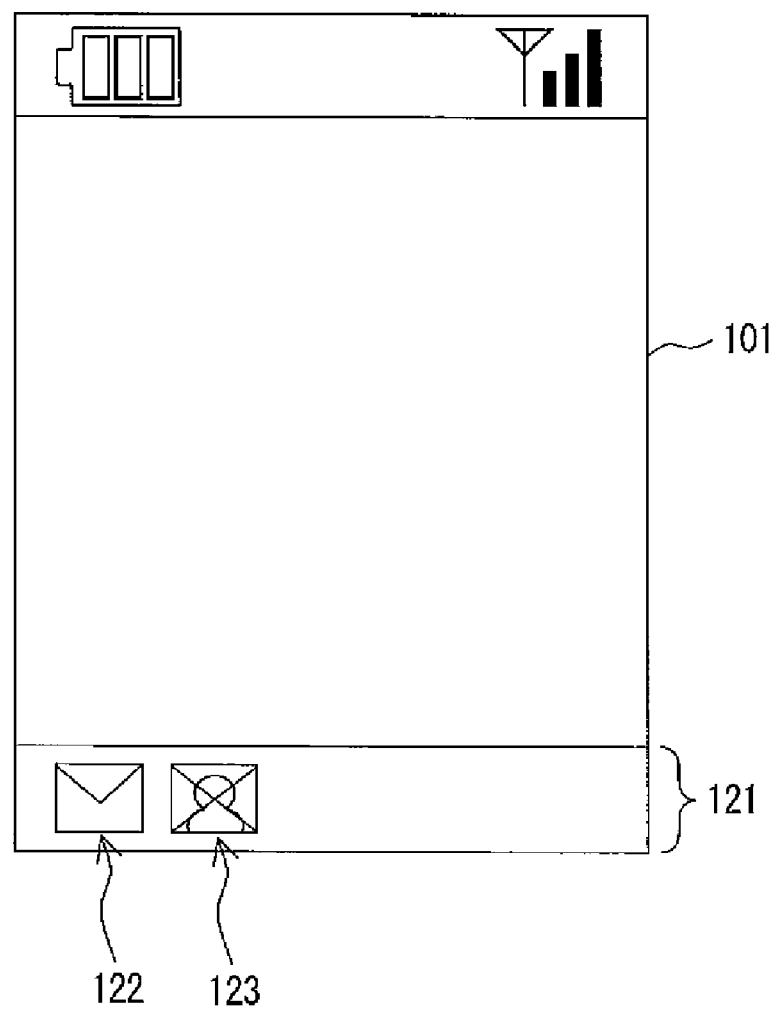

PORTABLE INFORMATION TERMINAL DEVICE

TECHNICAL FIELD

The present invention relates to a portable information terminal device, more specifically improvement of a portable information terminal device which carries out an authentication process on the basis of photographed images.

BACKGROUND ART

Portable information terminal devices such as mobile phones include devices provided with a camera for generating image data by photographing an object. In some of the portable information terminal devices of this kind distributed to the market recently, an authentication process (so-called face authentication) is carried out by guiding a user to photograph a face image by a camera during operation and comparing characteristic information such as a shape and size of eyes, nose, mouth and outline extracted from a photographed face image with user characteristic information which is stored in advance in a memory provided in the portable information terminal devices. Only when results of the authentication process show that a matching degree between characteristic information extracted from a photographed image and user characteristic information exceeds an authentication threshold value, a person who carries out operation at that time is determined to be a true user and authorized to execute processes thereafter, so that security improvement and privacy protection can be enhanced (ex. refer to Patent Document 1).

In general, an image photographed in an authentication process is not stored in a memory, and characteristic information extracted from the image is exclusively stored in a memory and compared with registered characteristic information. Here, if it is allowed to store an image photographed in an authentication process as history information when a person who differs from a true user such as, for example, a person who operates a stolen portable information terminal device tries to use the portable information terminal device illegally, the illegal user can be identified from the stored image after the portable image terminal device is retrieved, which is convenient. Therefore, various kinds of techniques have been proposed in the technical field of this kind in order to store images photographed in an authentication process as history information when the authentication process has failed (ex. refer to Patent Documents 1 to 3).

[Patent Document 1] Japanese Unexamined Patent Publication No. 2000-278658
[Patent Document 2] Japanese Unexamined Patent Publication No. 2005-115485
[Patent Document 3] Japanese Unexamined Patent Publication No. 2005-084991

DISCLOSURE OF THE INVENTION

Problems to be Solved by the Invention

In a failure in an authentication process according to the above conventional techniques, any images photographed in the authentication process are stored as history information. Accordingly, even if a person who performs operation photographs a surrounding scene instead of a face of the person in an authentication process, the image is stored in a memory as history. That is, information which is completely unnecessary to identify an illegal user is stored in a memory, which occasionally increases an amount of a memory to be used more than necessary.

The present invention was achieved by taking the above problems into consideration, and one objective of the present invention is to provide a portable information terminal device capable of exclusively storing information which is useful to identify the illegal user.

Another objective of the present invention is to provide a portable information terminal device capable of reducing an amount of a memory to be used.

Yet another objective of the present invention is to provide a portable information terminal device capable of identifying the illegal user more certainly.

Means Adapted to Solve the Problem

A portable information terminal device of a first aspect of the present invention includes: imaging means for photographing an object; characteristic information storage means for storing characteristic information extracted from face images as registered characteristic information in advance; authentication processing means for processing authentication by using the registered characteristic information on the basis an image photographed by said imaging means; and error history management means for causing error history storage means to store history information obtained when authentication has failed in said authentication process as error history information, wherein said authentication processing means has: characteristic extraction means for extracting characteristic information from said photographed image; matching degree calculation means for obtaining a numerically expressed matching degree by comparing characteristic information extracted by said characteristic extraction means with said registered characteristic information stored in said characteristic information storage means; and matching degree determination means for comparing said matching degree with an authentication threshold value, whereas said error history management means causes said error history storage means to store error history information, in a case where said characteristic information is extracted by said characteristic extraction means and also said matching degree is determined to be smaller than the authentication threshold value by said matching degree determination means.

According to such a configuration, error history information can be exclusively stored only when the matching degree between characteristic information extracted from the photographed image and the registered characteristic information is determined to be smaller than the authentication threshold value. That is, the error history information can be stored only in a case where, although the photographed image is a face image and the characteristic information of the face image such as a shape and size of eyes, nose, mouth, and outline is extracted, the matching degree between the characteristic information and user characteristic information stored in advance as the registered characteristic information is smaller than the authentication threshold value, thus a user is not determined to be a true user.

Therefore, only when the characteristic information is extracted from a face image of a person who differs from a true user such as, for example, a person who has stolen a portable information terminal device and tries to use the portable information terminal device illegally, history information obtained when authentication has failed in the authentication process is stored as error history information, so that the person can be identified from the error history information after the portable information terminal device is retrieved. Accordingly, storage of error history information can be prevented in such a case where a user cannot be identified as an illegal user from a photographed image, so that information which is useful to identify an illegal user can be exclusively stored and an amount of a memory to be used can be reduced.

The portable information terminal device of a second aspect of the present invention is provided with time counting means for counting time, wherein said error history information includes time information on time counted by said time counting means when said authentication process is carried out.

According to such a configuration, time information obtained when the authentication process is carried out can be stored as error history information. Accordingly, the illegal user can be identified from time information obtained when the authentication process is carried out after the portable information terminal device is retrieved, so that an illegal user can be identified more certainly.

In the portable information terminal device of a third aspect of the present invention, said error history information includes images photographed by said imaging means and used in sais authentication process.

According to such a configuration, a photographed image used in the authentication process, i.e. face image from which characteristic information is extracted can be stored as error history information. Accordingly, an illegal user can be identified from the face image after the portable information terminal device is retrieved, so that the illegal user can be identified more certainly.

The portable information terminal device of a fourth aspect of the present invention is provided with continuous authentication means for photographing an object again when authentication has failed in said authentication process so as to process authentication on the basis of the photographed image by controlling said imaging means and said authentication processing means, wherein the error history information includes entire images or one arbitrary image photographed by the imaging means and used in the authentication process.

According to such a configuration, if authentication has failed each time in a continuously repeated authentication process, entire photographed images (or face images) or one arbitrary image used in the authentication process can be stored as error history information. In the case of storing entire face images, an illegal user can be identified more certainly on the basis of these face images. In contrast, if one arbitrary face image is stored, an amount of a memory to be used can be reduced in comparison with the case of storing entire face images.

The portable information terminal device of a fifth aspect of the present invention is provided with positional information detection means for detecting positional information of said portable information terminal device, wherein said error history information includes positional information detected by said positional information detection means when said authentication process is carried out.

According to such a configuration, positional information obtained when the authentication process is carried out can be stored as error history information. Accordingly, after the portable information terminal device is retrieved, an illegal user can be identified from positional information obtained when the authentication process is carried out, which enables to identify the illegal user more certainly.

In the portable information terminal device of a sixth aspect of the present invention, said error history storage means is capable of storing a predetermined number of error history information in the descending order from the latest error history information, and said error history management means causes said error history storage means to store error history information in an authentication failure in a fixed time course after previous error history information has been stored.

According to such a configuration, if an illegal user finds out history information obtained when authentication has failed in the authentication process is stored as error history information and the authentication is processed for a predetermined number of times within a short period of time in order to delete error history information from the error history storage means in such a manner that a face of the user is not recognized, storage of such error history information obtained in the authentication process can be prevented. Accordingly, it is made possible to prevent the illegal user from intentionally deleting error history information which is useful to identity the illegal user from the error history storage means, so that the illegal user can be identified more certainly.

The portable information terminal device of a seventh aspect of the present invention is provided with an error display means for showing a standby screen to display a screen indicating that error history information is stored in said error history storage means.

According to such a configuration, if a user is unaware of unauthorized use of a portable information terminal device and error history information obtained at the time of the unauthorized use is stored in the error history storage means, a screen indicating the unauthorized use can be displayed in a standby screen and reported to the user.

Effects of the Invention

According to the portable information terminal device of the present invention, error history information can be stored only when the photographed image is a face image and the matching degree between the characteristic information extracted from the photographed image and the registered characteristic information is determined to be smaller than the authentication threshold value. Therefore, storage of error history information can be prevented in such a case that a user cannot be identified as an illegal user from the photographed image, so that information which is useful to identify the illegal user can be exclusively stored and an amount of a memory to be used can be reduced.

According to the portable information terminal device of the present invention, information stored as error history information includes time information obtained when the authentication process is carried out, photographed images used in the authentication process, and positional information obtained when the authentication process is carried out, so that an illegal user can be identified from these information after the portable information terminal device is retrieved, which enables to identify an illegal user more certainly. If the authentication process is repeated continuously and entire photographed images used in the authentication process are stored, an illegal user can be identified more certainly, whereas storing one arbitrary photographed image used in the authentication process allows reduction of an amount of a memory to be used.

According to the portable information terminal device of the present invention, error history information is stored only when authentication has failed in a fixed time course after previous error history information is stored, which thereby enables to prevent an illegal user from intentionally deleting error history information which is useful to identify the illegal user from the error history storage means, so that the illegal user can be identified more certainly.

According to the portable information terminal device of the present invention, when a user is unaware of unauthorized use of a portable information terminal device and error history information obtained at that time is stored in the error history storage means, a screen indicating the unauthorized use can be displayed in a standby screen and reported to the user.

BEST MODE FOR CARRYING OUT THE INVENTION

FIG. 1 is an appearance view showing an example of a portable information terminal device according to a first embodiment of the present invention, wherein a mobile phone 1 is presented as an example of the portable information terminal device. The mobile phone 1 is a so-called folding-type mobile phone, where a display case 100 and an operation case 200 are connected via a hinge part 300 so that the display case 100 and the operation case 200 can be folded by disposing respective faces of the cases to be opposed from one another.

The display case 100 has a case face which is disposed inside when it is folded and provided with a main display part 101, a telephone receiver 103, and a sub-camera 105, and a case face which is disposed outside when it is folded and provided with a sub-display part 102 and a main camera 104. The operation case 200 also has a case plane which is disposed inside when it is folded and provided with a multiple number of operation keys 201 and a telephone microphone 203. Such a folding-type mobile phone 1 can be compactly carried in a folded state, where depressing operation of the operation keys 201 can be performed while looking at a screen displayed in the main display part 101 when the cases are expanded. That is, main information is displayed by using the main display part 101, and main operation input is realized by using the operation keys 201.

The mobile phone 1 has a function (i.e. so-called face authentication function) to photograph a face image of a user by the sub-camera 105 when the user operates the operation keys 201 while looking at a screen displayed in the main display part 101, where the user who performs operation at that time is authorized to execute processes thereafter only when the user is determined to be a true user from the results of an authentication process performed on the basis of characteristic information which is extracted from the face image. Owing to the authentication process performed in execution of highly secretive functions, security enhancement and privacy protection can be realized.

FIG. 2 is a block diagram showing an example of an internal configuration of the mobile phone 1 shown in FIG. 1. A control part 400 is a processor for controlling main operation of the mobile phone 1, including an imaging unit driving control part 401, an authentication processing part 402, a continuous authentication part 403, an error history management part 404, a time counting part 405, and a positional information detection part 406. Operation signals outputted from the operation keys 201 are inputted to the control part 400 which is connected to a memory 410, an image input/output part 430, a voice input/output part 440, and a communication part 450 so as to enable input/output thereto/therefrom.

The image input/output part 430 includes the main display part 101, the sub-display part 102, the main camera 104, and the sub-camera 105. The main camera 104 and the sub-camera 105 are unitized as imaging units, and the imaging units are provided with a photoelectric conversion element and a control circuit such as a CCD (Charge-Coupled Device) or CMOS (Complementary Metal Oxide Semiconductor) image sensor. Employed here is a photoelectric conversion element which requires an initialization process such as offset and gain adjustments after supplying a power source to the imaging unit.

The voice input/output part 440 is provided with the receiver 103 and the transmitting microphone 203. The communication part 450 transmits/receives voice data and image data by transmitting/receiving radio waves to/from a base station not shown.

The imaging unit driving control part 401 controls driving of the main camera 104 and the sub-camera 105 by transmitting signals to the image input/output part 430. In the present embodiment, the imaging unit driving control part 401 controls driving of the sub-camera 105, so that a face image of a person who operates the operation keys 201 while looking at the main display part 101 is photographed by the sub-camera 105 in order to carry out the authentication process on the basis of characteristic information extracted from the face image. It should be noted that a configuration of performing an authentication process by photographing the face image using the main camera 104 may also be provided.

The authentication processing part 402 compares characteristic information extracted from a photographed image with user characteristic information (i.e. registered characteristic information) which is stored in advance in the memory 410 so as to determines whether or not a person who performs operation at that time is a true user. The continuous authentication part 403 controls the imaging unit driving control part 401 and the authentication processing part 402 so as continuously perform the authentication process for a plural number of times. In an authentication failure, the error history management part 404 stores history information obtained in the authentication as error history information in the memory 410.

The time counting part 405 counts time. The positional information detection part 406 detects positional information of the mobile phone 1, and the positional information detection part 406 is configured by a GPS (Global Positioning System).

Parts assigned to the memory 410 include a display screen data storage part 411, an image data storage part 412, a characteristic information storage part 413, and an error history information storage part 414. The screen data displayed in the main display part 101 and the sub-display part 102 is stored in the display screen data storage part 411. The image data storage part 412 stores image data photographed by the main camera 104 and the sub-camera 105, and image data received from the outside via the communication part 450. The characteristic information storage part 413 stores characteristic information of face images for use in the authentication process.

The error history information storage part 414 stores a predetermined number of error history information in the descending order from the latest error history information. That is, if the authentication has failed in a state that the number of error history information stored in the error history information storage part 414 does not reach the above predetermined number, error history information obtained in the authentication is additionally stored in the error history information storage part 414. In contrast, if the authentication has failed in a state that the error history information storage part 414 stores the above predetermined number of error history information, oldest error history information is deleted and new error history information obtained in the authentication is stored.

Information stored as error history information includes, for example, time information outputted from the time counting part 405 when the authentication process is carried out, images photographed by the sub-camera 105 and used in the authentication process, positional information outputted from the positional information detection part 406 when the authentication process is carried out, and other information.

It should be noted that a configuration may be provided in such that characteristic information of face images and image data of face images for use in the authentication process is stored in a storage medium (not shown) such as, for example, an SIM (Subscriber Identity Module) card which is attachable to the mobile phone 1.

FIG. 3 is a block diagram showing a configuration example of the imaging unit driving control part 401 of FIG. 2. The imaging unit driving control part 401 is provided with an imaging unit starting part 407, an imaging control part 408, and an imaging unit stopping part 409. The imaging unit starting part 407 transmits control signals to the main camera 104 and the sub-camera 105 so as to start these cameras, including a power supply part 407A for supplying a power source to the main camera 104 and sub-camera 105 on the basis of operation by a user, and an initialization processing part 407B for executing an initialization process.

The imaging control part 408 controls photographing operation of the main camera 104 and sub-camera 105 on the basis of input signals from the initialization processing part 407B and photographing operation by a user in order to generate still image data of an object obtained at that time with respect to the main camera 104 and the sub-camera 105. The imaging unit stopping part 409 discontinues a power supply to the main camera 104 and the sub-camera 105, where driving these imaging units is discontinued.

FIG. 4 is a block diagram showing a configuration example of the authentication processing part 402 of FIG. 2. The authentication processing part 402 is provided with a characteristic extraction part 402A, a matching degree calculation part 402B, and a matching degree determination part 402C. When an authentication process starts, the characteristic extraction part 402A extracts characteristic information such as a shape and size of each part of a face such as eyes, nose, mouth and outline from a face image photographed by the sub-camera 105.

When a photographed image is not a face image but a scene image or other image, it is impossible to extract characteristic information from the photographed image. In this case, authentication will be failed, but error history information obtained at this time is not stored in the error history information storage part 414 of the memory 410. In contrast, if the characteristic information is successfully extracted from the photographed image, the matching degree calculation part 402B compares the characteristic information with registered characteristic information stored in the characteristic information storage part 413 of the memory 410 so as to calculate a numerically expressed matching degree.

The matching degree determination part 402C compares a matching degree calculated by the matching degree calculation part 402B with a predetermined threshold value (i.e. authentication threshold value) so as to output the comparison results. At this time, if the matching degree exceeds the authentication threshold value, it means that a user is determined to be a true user and authentication has succeeded, whereas if the matching degree is smaller than an authentication threshold value, it means that the user is not determined to be the true user and the authentication has failed. The matching degree here is a ratio (%) occupied by matching characteristic information out of entire characteristic information compared, where the authentication threshold value is usually set to be a predetermined value equal to or larger than 90%.

Comparison results outputted from the matching degree determination part 402C are inputted to the error history management part 404. In an authentication failure, the error history management part 404 causes the error history information storage part 414 to store error history information obtained in the authentication. In contrast, in an authentication success, or if the authentication has failed within a predetermined amount of time after previous error history information is stored in the error history information storage part 414, the error history management part 404 does not cause the error history information storage part 414 to store error history information obtained in the authentication. That is, the error history management part 404 causes the error history information storage part 414 to store error history information only when the authentication has failed in a fixed time course after previous error history information has been stored.

In the present embodiment, error history information can be stored only when a matching degree between characteristic information extracted from a photographed image and registered characteristic information is determined to be smaller than an authentication threshold value. That is, error history information can be stored only when a photographed image is a face image and a user is not determined to be a true user because the matching degree between the characteristic information extracted from the face image such as, for example, a shape and size of eyes, nose, mouth and outline, and the user characteristic information stored in advance as the registered characteristic information is smaller than the authentication threshold value.

Therefore, only when the characteristic information of a person who differs from a true user such as, for example, a person who has stolen the mobile phone 1 tries to use the mobile phone 1 illegally is extracted from a face image of the person, history information obtained when the authentication has failed in an authentication process is stored as error history information, which makes it possible to identify the person from the error history information after the mobile phone 1 is retrieved. Accordingly, storage of error history information can be prevented when a user cannot be identified as an illegal user from a photographed image, so that information which is useful to identify an illegal user can be exclusively stored and an amount of the memory 410 to be used can be reduced.

Moreover, owing to a configuration of storing error history information only when the authentication has failed in a fixed time course after previous error history information has been stored, when an illegal user finds out history information obtained when the authentication has failed in the authentication process is stored as error history information and the authentication is processed for a plural number of times within a short period of time in order to delete the error history information from the error history information storage part 414 in such a manner that a face of the user is not recognized, storage of error history information obtained in the authentication process can be prevented. Accordingly, it is made possible to prevent an illegal user from intentionally deleting error history information which is useful to identify the illegal user from the error history information storage part 414, so that the illegal user can be identified more certainly.

FIG. 5 is a diagram showing a display example of the main display part 101 in a setting of face authentication. When a user reads a security setting screen by operating the operation keys 201 (refer to FIG. 5(*a*)) and carries out operation to select a "face authentication setting" item out of items displayed in the security setting screen, the main display part 101 displays a screen for guiding a user to input a terminal password which is assigned to the mobile phone 1 in advance (refer to FIG. 5(*b*)). In this display screen, if a user operates a clear key included in the operation keys 201, the main display part 101 returns to display the security setting screen shown in FIG. 5(*a*).

The terminal password is made of an arbitrary character string of four to eight digits for example and set in advance at the time of purchasing the mobile phone 1 but can be changed by a user in operation of the operation keys 201. In the terminal password input screen of FIG. 5(*b*), if a character string inputted by operating the operation keys 201 does not match a terminal password set in advance, a screen indicating the mismatch is displayed in the main display part 101 (refer to FIG. 5(*c*)). If a character string equal to or less than three digits is inputted in the terminal password input screen, the main display part 101 displays a screen indicating a character string of four to eight digits should be inputted (refer to FIG. 5(*d*)).

If a predetermined amount of time lapses into timeout or any key included in the operation keys 201 is operated after the main display part 101 displays a screen as shown in FIG. 5(*c*) or FIG. 5(*d*), the main display part 101 returns to the display of the security setting screen as shown in FIG. 5(*a*).

When a character string inputted in the terminal password input screen of FIG. 5(*b*) matches a terminal password set in advance, the main display part 101 is switched to display a face authentication utilization setting screen for setting on/off of a mode to carry out face authentication (refer to FIG. 5(*e*)). In this display screen, operation of the clear key included in the operation keys 201 causes the main display part 101 to return to display the terminal password input screen shown in FIG. 5(*b*). Moreover, if the face authentication is turned off by operating the operation key 201 in the face authentication utilization setting screen, the main display part 101 returns to display the security setting screen shown in FIG. 5(*a*).

In the face authentication utilization setting screen of FIG. 5(*e*), if face authentication is turned on by operating the operation key 201, the main display part 101 is switched to display a face authentication setting screen for the setting of face authentication (refer to FIG. 5(*f*)).

In the present embodiment, characteristic information which is extracted from image data of seven pieces at maximum can be stored in the memory 410 as registered characteristic information for use in face authentication. Face authentication based on registered characteristic information which is extracted from image data of two or more pieces increases a probability of successful authentication (i.e. person acceptance ratio) when a true user carries out face authentication, where authentication failures caused by slight differences such as facial expression of a user and an angle to receive light can be prevented. However, the configuration of extracting registered characteristic information for use in face authentication from image data of seven pieces is not limited, and there may also be a configuration of performing face authentication on the basis of registered characteristic information extracted from single image data for example.

Face images of a user are photographed in advance by the user using the main camera 104 or the sub-camera 105 so as to store these image data in the image data storage part 412 of the memory 410. Since face authentication is carried out on the basis of registered characteristic information which is extracted from these image data and stored in the characteristic information storage part 413 of the memory 410, these image data is not required in face authentication, but can be stored in the memory 410 to confirm face images by a user who reads these image data, so that conveniences in operation can be improved.

The face authentication setting screen of FIG. 5(*f*) includes items which are made to correspond to respective images expressing a user (i.e. face authentication images) as extraction sources of the aforementioned registered characteristic information, an item which is made to correspond to a setting of an authentication threshold value in face authentication (i.e. security level setting), and an item which is made to correspond to error history. In this display screen, if any one of the items which are made to correspond to face authentication images is selected, a screen for overwriting registration and confirmation of a face authentication image (i.e. face authentication image registration screen) is displayed. If the item which is made to correspond to a security level setting is selected, a screen for setting an authentication threshold value for use in face authentication (i.e. security level setting screen) is displayed. Moreover, if the item which is made to correspond to error history is selected, a screen for displaying the error history (error history screen) is displayed.

Various kinds of these settings are followed by operation of the operation keys 201 to complete the face authentication setting, where the main display part 101 is switched to display a screen as shown in FIG. 5(*g*) or FIG. 5(*h*). That is, if at least one of face authentication images is registered, the main display part 101 displays a screen indicating face authentication is carried out on the basis of characteristic information extracted from the face authentication image (refer to FIG. 5(*g*)), where selection of a confirmation key 111 included in this screen causes the main display part 101 to return to display the security setting screen shown in FIG. 5(*a*) In contrast, if none of face authentication images is registered, the main display part 101 displays a screen indicating to register face authentication images (refer to FIG. 5(*h*)), where selection of a confirmation key 112 included in this screen causes the main display part 101 to return to display the face authentication setting screen shown in FIG. 5(*f*).

FIG. 6 is a diagram showing a display example of a face authentication image registration screen. In the face authentication setting screen of FIG. 5(*f*), if any one of the items which are made to correspond to face authentication images is selected, the main display part 101 is switched to display the face authentication image registration screen corresponding to the face authentication image as shown in FIG. 6(*a*). The face authentication image registration screen includes an item for "overwrite registration" and an item for "registration data confirmation".

Operation to select the item for "overwrite registration" out of the items displayed in the face authentication image registration screen of FIG. 6(*a*) causes the sub-camera 105 to start, where the main display part 101 displays an image of an object with respect to the sub-camera 105 in real time after the sub-camera 105 is brought into a photographable state (refer to FIG. 6(*b*)). At this time, the main display part 101 functions as a finder of the sub-camera 105, where a face of a person who performs operation while looking at a screen displayed in the main display part 101 is projected in a finder screen constituted by the main display part 101.

In the finder screen of FIG. 6(*b*), registration operation performed by operation of a determination key included in the operation keys 201 is carried out after positional adjustments of a face of a user by the user himself, which is followed by an extracting process of characteristic information by the characteristic extraction part 402A of the control part 400 from an image photographed by the sub-camera 105 at that time.

In this case, characteristic information such as a shape and size of eyes, nose, mouth and outline can be extracted if positional adjustments of a face of a user are appropriately made, but characteristic information cannot be extracted if positional adjustments are not appropriately made or if the face of the user is not projected in the main display part 101 at all. Successfully extracted characteristic information is stored in the characteristic information storage part 413 of the memory 410, while face images obtained at that time are stored as face authentication images in the image data storage part 412 of the memory 410.

If extraction of characteristic information has succeeded, the main display part 101 displays a screen indicating that characteristic information based on the face images is stored (or recorded) in the memory 410 (refer to FIG. 6(c)). If a user selects a confirmation key 113 included in the display screen, the main display part 101 returns to display the face authentication setting screen shown in FIG. 5(f). In contrast, in a case of failing to extract characteristic information, the main display part 101 displays a screen indicating the failure with a reason of the failure in the characteristic information extraction (refer to FIG. 6(d)), where selection of a confirmation key 114 included in the display screen by a user causes the main display part 101 to return to display a finder screen shown in FIG. 5(b), and a face image can be photographed by the sub-camera 105 again.

Operation to select the item for "registration data confirmation" out of the items displayed in the face authentication image registration screen of FIG. 6(a) is followed by reading a corresponding face authentication image stored in the image data storage part 412 of the memory 410, where the face authentication image is displayed in the main display part 101 (refer to FIG. 6(e)). A user is allowed to confirm a registered face authentication image from the face authentication image confirmation screen shown in FIG. 6(e). In this display screen, operation of the clear key included in the operation keys 201 causes the main display part 101 to return to display the face authentication image registration screen shown in FIG. 6(a).

In the face authentication image confirmation screen of FIG. 6(e), operation of the operation keys 201 by a user to delete a corresponding face authentication image causes the main display part 101 to switch to display a deletion confirmation screen for confirming whether or not the face authentication image may be deleted (refer to FIG. 6(f)). This display screen includes a "yes" key 115 for instructing to delete the face authentication image and a "no" key 116 for instructing not to delete the face authentication Image. In the deletion confirmation screen of FIG. 6(f), selection of the "yes" key 116 by operating the operation keys 201 causes the main display part 101 to return to display the face authentication image confirmation screen shown in FIG. 6(e).

In the deletion confirmation screen of FIG. 6(f), selection of the "yes" key 115 by operating the operation keys 201 causes the image data storage part 412 and the characteristic information storage part 413 of the memory 410 to start processes to delete a corresponding face authentication image and registered characteristic information, where the main display part 101 displays a screen indicating it is in the process of deletion (refer to FIG. 6(g)). When the processes to delete the face authentication image and registered characteristic information are completed, the main display part 101 displays a screen indicating the process completion (refer to FIG. 6(h)), and the main display part 101 returns to display the face authentication setting screen shown in FIG. 5(f) due to timeout after a predetermined amount of time lapses or in response to operation of any key included in the operation keys 201.

FIG. 7 is a diagram showing a display example of a security level setting screen. In the face authentication setting screen of FIG. 5(f), selection of the item which is made to correspond to the security level setting causes the main display part 101 to switch to display the security level setting screen for setting an authentication threshold value for use in face authentication as shown in FIG. 7. Security levels set in advance include a "level 3" having a highest authentication threshold value, "level 2" having an authentication threshold value which is lower than that of the "level 3", and "level 1" having an authentication threshold value which is lower than that of the "level 2", where any one of the security levels can be selected in the security level setting screen.

FIG. 8 is a diagram showing a display example of an error history screen. In the face authentication setting screen of FIG. 5(f), selection of the item which is made to correspond to the error history causes the main display part 101 to switch to display the error history screen for displaying an error history as shown in FIG. 8. The error history screen displays a list of time information expressing data/time of a predetermined number of authentication failures (ex. 9 failures) as error history information. In the case of having a new authentication failure in a state that the above error history information including a predetermined number of failures is stored in the error history information storage part 414 of the memory 410, oldest error history information is deleted and new error history information is stored in the memory 410, while the error history screen is renewed to display the new error history information.

FIG. 9 is a diagram showing a display example of the main display part 101 when face authentication is carried out. In this example, face authentication is carried out in switching on/off of a secret mode included in management functions of the mobile phone 1. The on state of the secret mode exhibits a state where not only normal data but also data registered in advance as secret data are displayed, whereas the off state of the secret mode exhibits a state where normal data is exclusively displayed without displaying secret data.

In a management function screen for setting management functions of the mobile phone 1 as shown in FIG. 9(a), operation to select a "secret mode" item out of items displayed in the management function screen causes the sub-camera 105 to start. The sub-camera 105 is then brought into a photographable state, followed by displaying an image of an object with respect to the sub-camera 105 in the main display part 101 in real time (refer to FIG. 9(b)), where automatic authentication starts. At this time, when the sub-camera 105 is brought into a photographable state after finishing an initialization process thereof, a face image for authentication is photographed without performing photographing operation by a user, where the characteristic information is further extracted from the photographed image. The extracted characteristic information is compared with user characteristic information stored in advance in the characteristic information storage part 413 of the memory 410, which enables an authentication process to be performed automatically.

In this authentication process, if a matching degree between extracted characteristic information of a face image and user characteristic information stored in the memory 410 exceeds an authentication threshold value which is set in advance in the security level setting screen, the operator is determined to be a true user. In this case, a user is informed of an authentication success by visual effects of a highlight display which is realized by a so-called action focus with respect to a face image of the user displayed in the main display part 101.

Thereafter, the main display part 101 displays a message indicating an authentication success (refer to FIG. 9(*c*)), followed by switching to a screen for turning on/off the secret mode after a predetermined amount of time lapses (refer to FIG. 9(*d*)). In contrast, in the case of an authentication failure due to a smaller matching degree of characteristic information than the authentication threshold value, characteristic information is automatically extracted from an image photographed by the sub-camera 105 at that time, and the characteristic information is compared with user characteristic information stored in the memory 410.

In the present embodiment, the authentication process is thus continuously repeated in an authentication failure until a predetermined amount of time (ex. three seconds) lapses into timeout, and the authentication process is completed when authentication has succeeded. For example, if an amount of time to reach timeout is set to be three seconds, the authentication process is repeated for about seven times at maximum. That is, an amount of time required for a single authentication process is about 0.4 second, and successful authentication in a single authentication process makes it is possible to proceed to a subsequent process with substantially no waiting time after finishing an initialization process of the sub-camera 105. While the authentication process is repeated, the main display part 101 displays a finder screen, where an image of an object with respect to the sub-camera 105 is displayed in real time.

While the authentication process is repeated for a predetermined number of times, the main display part 101 displays a screen corresponding to a matching degree of the characteristic information as a comparison result of the characteristic information obtained in each of the authentication processes. More specifically, a frame 117 of a finder screen displayed in the main display part 101 is displayed by a color corresponding to the matching degree of the characteristic information. Therefore, a comparison result of the matching degree of the characteristic information obtained at the time of the authentication process is displayed, so that a user is allowed to confirm whether or not a face image of the user photographed in the authentication process is an easily recognizable image on the basis of the display.

It should be noted that such a configuration is not limited, and a configuration of presenting the matching degree of the characteristic information in the main display part 101 by a level display using a numerical value and graph or the like may be provided. Moreover, a configuration of displaying comparison results in entire authentication processes is not limited, and there may also be a configuration of displaying the comparison results at least in a single authentication process.

In a case of reaching timeout after a predetermined amount of time lapses from the start of automatic authentication, the main display part 101 displays a screen indicating an authentication failure (refer to FIG. 9(*e*)). Selection of a re-authentication key 118 included in the displayed screen by a user causes the main display part 101 to return to display a finder screen shown in FIG. 9(*b*), where the automatic authentication starts again. Whereas, selection of a terminal password input key 119 displayed in the main display part 101 in FIG. 9(*e*) by the user causes the main display part 101 to switch to display a terminal password input screen for guiding the user to input a terminal password (refer to FIG. 9(*f*)).

If a character string inputted in the terminal password input screen of FIG. 9(*f*) matches a terminal password set in advance, the main display part 101 is switched to display a screen for switching on/off of the secret mode (refer to FIG. 9(*d*)).

In contrast, if a character string inputted in the terminal password input screen of FIG. 9(*f*) by operating the operation keys 201 does not match the terminal password set in advance, the main display part 101 displays a screen indicating the mismatch (refer to FIG. 9(*g*)). If a character string equal to or less than three digits is inputted in the terminal password input screen, the main display part 101 displays a screen indicating a character string of four to eight digits should be inputted (refer to FIG. 9(*h*)). After displaying the screen shown in FIG. 9(*g*) or FIG. 9(*h*), a predetermined amount of time lapses into timeout or a user operates any key included in the operation keys 201, where the main display part 101 returns to display the management function screen shown in FIG. 9(*a*).

According to the configuration of automatically performing the authentication process again in an authentication failure in the authentication process in the same manner with the present embodiments, even if a true user performs operation and the user is not determined to be a true user in a first authentication process, the authentication process is carried out again without performing photographing operation by a user thereafter. That is, the authentication process is automatically repeated until the user is determined to be the true user, which enables to reduce excessive time and labor required in the authentication process and shorten an amount of time required in the authentication process.

In photographing a face image in the authentication process, it is preferable to provide a configuration without having a shutter sound. Owing to such a configuration, a user can be prevented from being misunderstood as stealthily photographing an object or the like due to a shutter sound generated when the authentication process is carried out in an environment surrounded by people in a train or the like. In the present embodiment, photographing operation is not carried out in the authentication process, so that a user can be prevented from being misunderstood as stealthily photographing an object due to the photographing operation.

It should be noted that there is no limitations for a configuration to reach timeout if a user is not determined to be a true user within a predetermined period of time, and the authentication process may also be repeated in a configuration until successful authentication is achieved. Moreover, the configuration of continuously performing the authentication process is not limited, and there may also be a configuration where the authentication process is carried out only for once after the sub-camera 105 is started and brought into a photographable state.

FIG. 10 is a diagram showing display examples obtained when error history information is selected from the error history screen, presenting: a) a state to select error history information; b) a first display example for selected error history information; and c) a second display example for selected error history information.

In the error history screen as shown in FIG. 8, a user operates the operation keys 201 to adjust a cursor 120 to any one of error history information (i.e. time information) displayed in a list in the main display part 101, followed by the determination operation to select the error history information (refer to FIG. 10(*a*)).

In the first display example shown in FIG. 10(*b*), on the basis of the selection operation of the error history information, an image which was photographed by the sub-camera 105 and used in the authentication process for storing the error history information is read from the error history information storage part 414, and the photographed image is displayed in the main display part 101. In the case of performing continuous authentication as observed in the present embodiment, a plurality of photographed images is used in the authentication, so that the main display part 101 displays these photographed images entirely or one arbitrary image. When the main display part 101 displays a plurality of photographed images entirely, these photographed images may be displayed in a thumbnail in the main display part 101. When operation to select any one of the photographed images is carried out, a selected photographed image may be largely displayed in an entire screen of the main display part 101.

It should be noted that an image photographed by the sub-camera 105 in a single authentication operation may be displayed in the main display part 101 in a configuration where the authentication process is carried out only for once, which differs from the configuration of the present embodiment.

In a second display example shown in FIG. 10(*c*), positional information detected by the positional information detection part 406 in the authentication process in which error history information is stored is read from the error history information storage part 414 on the basis of the selection operation of the error history information, and the positional information is displayed in the main display part 101. In this example, the main display part 101 displays a geographical name as positional information, but such a configuration is not limited and there may also be a configuration of, for example, displaying a map in the main display part 101 so as to identify positional information detected on the map.

There is no limitations for the configuration where the main display part 101 displays a list of time information obtained when the authentication process was carried out as error history information, and the main display part 101 may also be configured to display time information by selecting error history displayed in a list and reading the time information obtained in the authentication process corresponding to the error history from the error history information storage part 414. There may also be a configuration where information with respect to each of error history including time information obtained when the authentication process is carried out, photographed images used in the authentication, and positional information obtained when the authentication process is carried out is displayed all at once, or there may also be a configuration of displaying any one of these error history information by a user selection.

In the present embodiment, information stored as error history information includes time information obtained when the authentication process is carried out, photographed images used in the authentication process, and positional information obtained when the authentication process is carried out, so that an illegal user can be identified from these information after the mobile phone 1 is retrieved, where an illegal user can be identified more certainly. When the authentication is carried out continuously, storing entire photographed images used in the authentication process makes it possible to identify an illegal user more certainly on the basis of these photographed images (or face images), and storing one arbitrary photographed image allows reduction of an amount of the memory 410 to be used in comparison with a case of storing entire photographed images.

FIG. 11 is a diagram showing an example of a standby screen displayed in the main display part 101. The standby screen here is provided in a state where a power source is supplied to the mobile phone 1, being a screen displayed in the main display part 101 when applications are not started.

In an example shown in FIG. 11, arranged in a portion of the standby screen displayed in the main display part 101 is a reporting area 121 for displaying predetermined icons for use in reporting information to a user. In this example, icons displayed in the reporting area 121 includes a mail reception icon 122 for reporting reception of a new electronic mail, and an error display icon (or error display means) 123 for reporting storage of new error history information. Therefore, when a user is unaware of unauthorized use of the mobile phone 1 and error history information obtained at that time is stored in the error history information storage part 414, a screen indicating the unauthorized use can be displayed in the standby screen and reported to a user.

Furthermore, the face authentication is not limited to be carried out at the time of switching on/off of the secret mode, and the face authentication can be carried out in various kinds of setting operation related to other functions whose security level or privacy level is high, including, for example, a card setting, call termination, lock setting, password change, caller number notification/non-notification setting, setting reset, software renewal, detail display of its own station number, and other data changes.

Also, the authentication process is not limited to face authentication performed on the basis of face images, and may be carried out on the basis of fingerprint images of a user or any other images which express a user. In this case, the characteristic information of finger print images is extracted and compared to realize the authentication process.

The present invention is not limited to contents of the above embodiments, wherein various kinds of changes can be made within a range of claim descriptions.

The present application claims priority under Paris convention on the basis of Japanese patent application No. 2005-212806 filed on Jul. 22, 2005, and cites entire contents referred from said patent application.

BRIEF DESCRIPTION OF THE DRAWINGS

FIG. 1 is an appearance view showing an example of a portable information terminal device according to an embodiment of the present invention, where a mobile phone is presented as an example of the portable information terminal device.

FIG. 2 is a block diagram showing an example of an internal configuration of the mobile phone shown in FIG. 1.

FIG. 3 is a block diagram showing a configuration example of an imaging unit driving control part of FIG. 2.

FIG. 4 is a block diagram showing a configuration example of an authentication processing part of FIG. 2.

FIG. 5 is a diagram showing a display example of a main display part in a setting related to face authentication.

FIG. 6 is a diagram showing a display example of a face authentication image registration screen.

FIG. 7 is a diagram showing a display example of a security level setting screen.

FIG. 8 is a diagram showing a display example of an error history screen.

FIG. 9 is a diagram showing a display example of the main display part when face authentication is carried out.

FIG. 10 is a diagram showing display examples obtained when a user selects error history information from an error history screen, presenting a) a state to select error history information; b) a first display example for selected error history information; and c) a second display example for selected error history information.

FIG. 11 is a diagram showing an example of a standby screen displayed in the main display part.

The invention claimed is:

1. A portable information terminal device comprising:
an imaging module for photographing an object;
a characteristic information storage module for storing characteristic information extracted from face images as registered characteristic information in advance;
an authentication processing module for processing authentication by using said registered characteristic information on the basis of an image photographed by said imaging module; and
an error history management module for causing an authentication failure storage module to store history information obtained when authentication has failed in said authentication process as authentication failure information, wherein
said authentication processing module including: a characteristic extraction module for extracting characteristic information from said photographed image; matching degree calculation module for obtaining a numerically expressed matching degree by comparing characteristic information extracted by said characteristic extraction module with said registered characteristic information stored in said characteristic information storage module; and matching degree determination module for comparing said matching degree with an authentication threshold value,
said error history management module causes said authentication failure storage module to store authentication failure information only when said characteristic information extracted by said characteristic extraction module and said matching degree is determined to be smaller than said authentication threshold value by said matching degree determination module,
a predetermined number of plural authentication failure information can be stored in said authentication failure storage module in the descending order from the latest authentication failure information,
said error history management module determining whether authentication has failed before or after a fixed period of time after previous authentication failure information has been stored, and
said error history management module causes said authentication failure storage module to store authentication failure information when authentication has failed after a fixed period of time after previous authentication failure information has been stored, and to not store authentication failure information when authentication has failed before the fixed period of time after previous authentication failure information has been stored.

2. The portable information terminal device according to claim 1, further comprising a time counting module for counting time, wherein
said authentication failure information includes time information on time counted by said time counting module when said authentication process is carried out.

3. The portable information terminal device according to claim 1, wherein said authentication failure information includes images photographed by said imaging module and used in said authentication process.

4. The portable information terminal device according to claim 1, further comprising a continuous authentication module for photographing an object again when authentication has failed in said authentication process so as to process authentication on the basis of the photographed image by controlling said imaging module and said authentication processing module, wherein
said authentication failure information includes entire images or one arbitrary image photographed by said imaging module and used in said authentication process.

5. The portable information terminal device according to claim 1, further comprising a positional information detection module for detecting positional information of said portable information terminal device, wherein
said authentication failure information includes said positional information detected by said positional information detection module when said authentication process is carried out.

6. The portable information terminal device according to claim 1, comprising an error display module for showing a standby screen to display a screen indicating that authentication failure information is stored in said authentication failure storage module.

* * * * *